Figure 1:
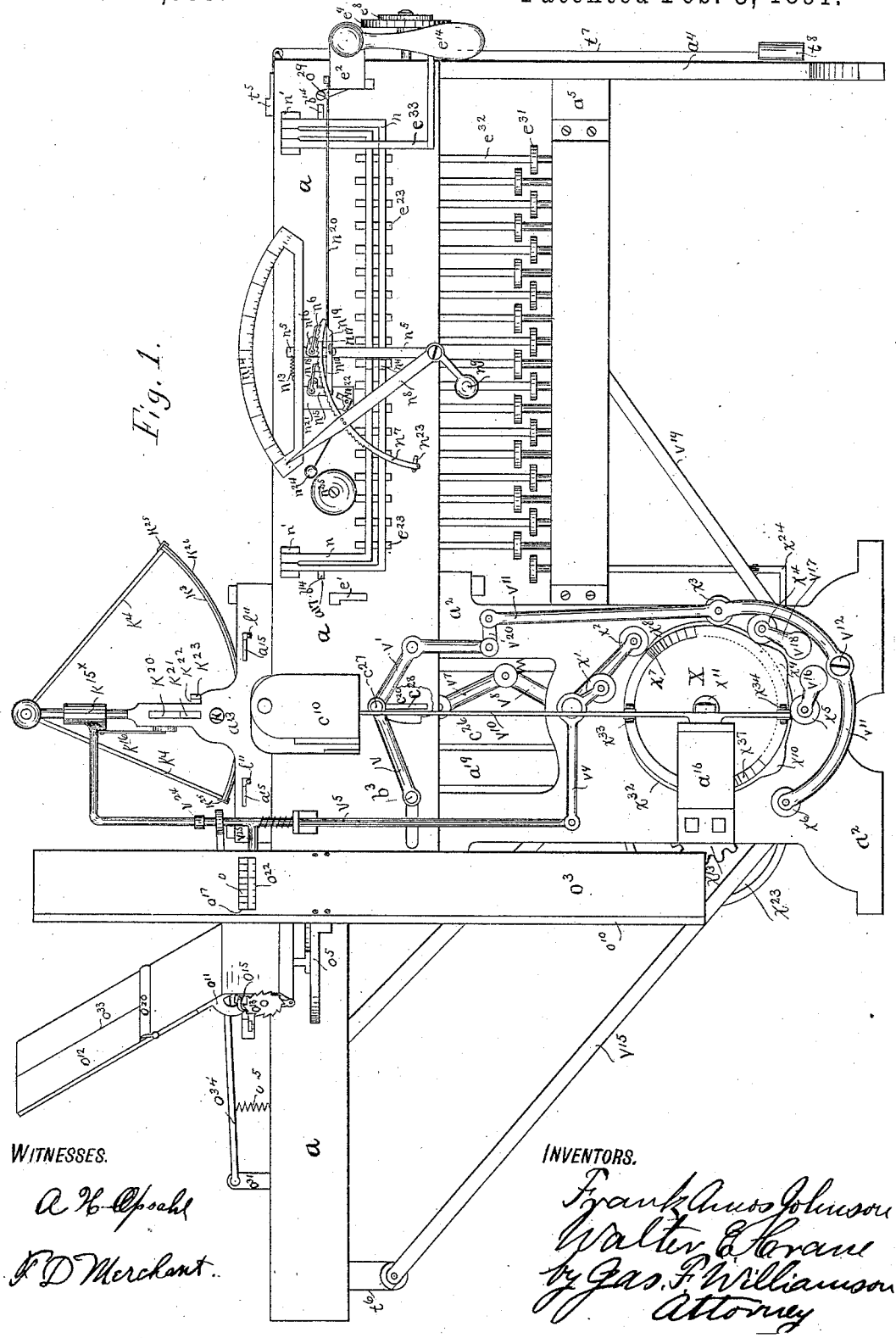

(No Model.) 9 Sheets—Sheet 3.

F. A. JOHNSON & W. E. CRANE.
MACHINE FOR PRODUCING PRINTING SURFACES.

No. 445,559. Patented Feb. 3, 1891.

WITNESSES.
INVENTORS.

(No Model.) 9 Sheets—Sheet 4.
F. A. JOHNSON & W. E. CRANE.
MACHINE FOR PRODUCING PRINTING SURFACES.
No. 445,559. Patented Feb. 3, 1891.
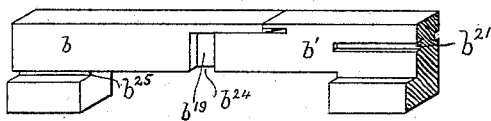
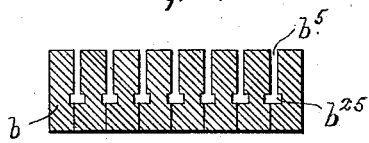
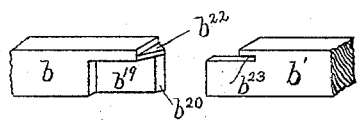
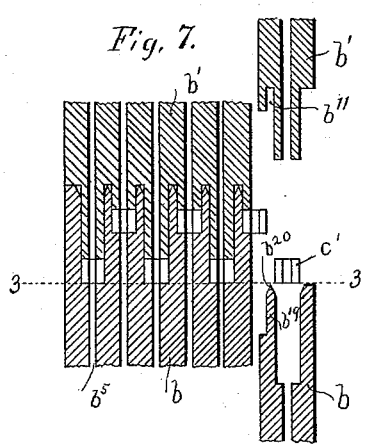
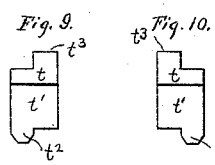  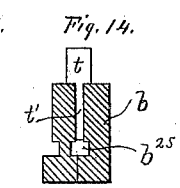
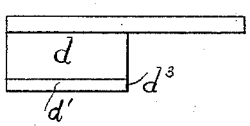 
WITNESSES.
A. H. Opsahl.
K. D. Merchant.
INVENTORS.
Frank Amos Johnson
Walter E. Crane
by Jas. F. Williamson
Attorney (No Model.) 9 Sheets—Sheet 5.
F. A. JOHNSON & W. E. CRANE.
MACHINE FOR PRODUCING PRINTING SURFACES.
No. 445,559. Patented Feb. 3, 1891.
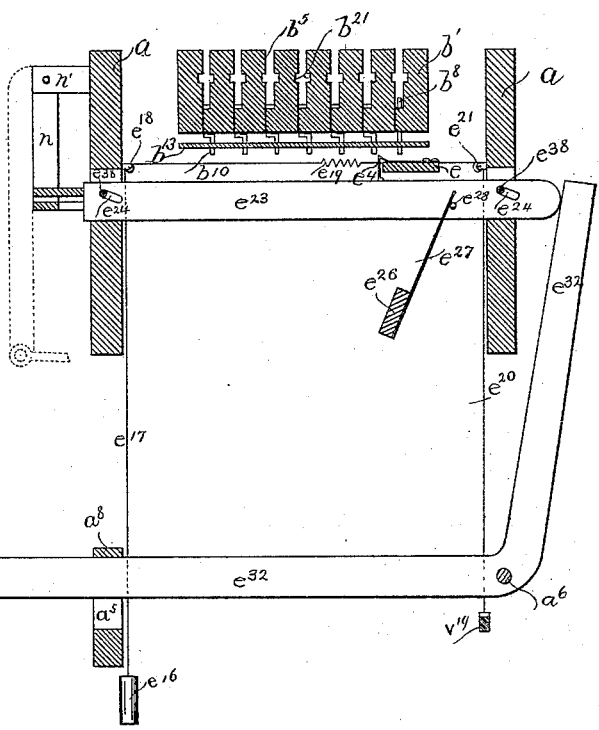
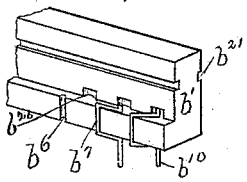
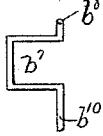
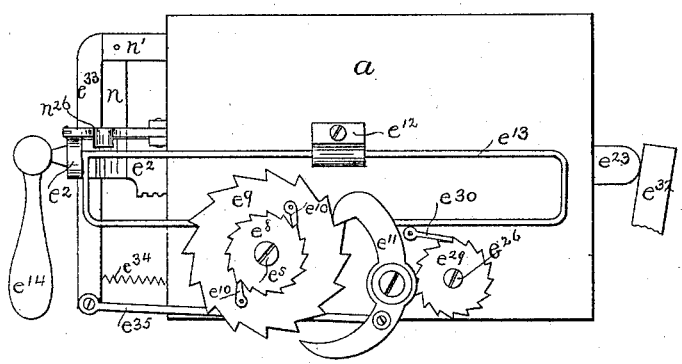
WITNESSES.
A. H. Opsahl.
F. D. Merchant.
INVENTORS
Frank Amos Johnson
Walter E. Crane
by Jas. F. Williamson
Attorney (No Model.) 9 Sheets—Sheet 6.

F. A. JOHNSON & W. E. CRANE.
MACHINE FOR PRODUCING PRINTING SURFACES.

No. 445,559. Patented Feb. 3, 1891.

WITNESSES.
A. H. Opsahl
F. D. Merchant

INVENTORS.
Frank Amos Johnson
Walter E. Crane
by Jas. F. Williamson (No Model.) 9 Sheets—Sheet 7.

F. A. JOHNSON & W. E. CRANE.
MACHINE FOR PRODUCING PRINTING SURFACES.

No. 445,559. Patented Feb. 3, 1891.

WITNESSES
INVENTORS.
Frank Amos Johnson
Walter E. Crane
by Jas. F. Williamson
Attorney (No Model.) 9 Sheets—Sheet 8.
F. A. JOHNSON & W. E. CRANE.
MACHINE FOR PRODUCING PRINTING SURFACES.
No. 445,559. Patented Feb. 3, 1891.
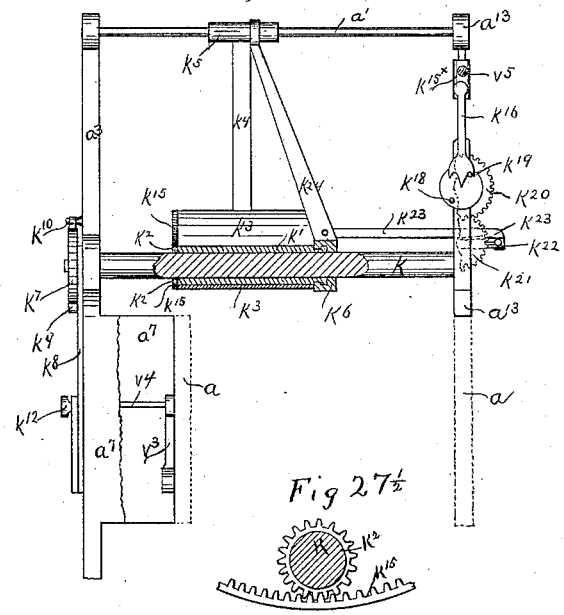
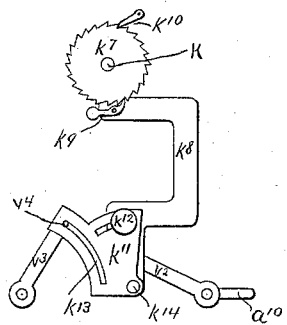
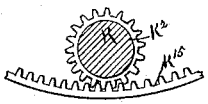
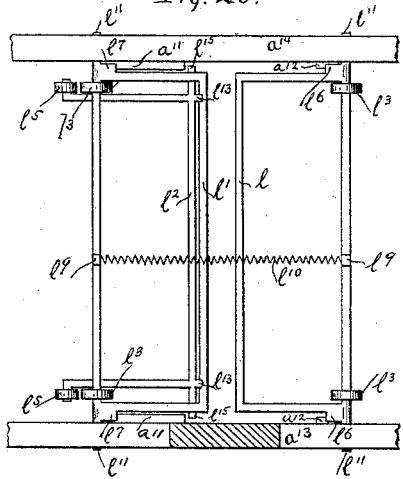
WITNESSES.
A. H. Opsahl
F. D. Merchant
INVENTORS
Frank Amos Johnson
Walter E Crane
by Jas. F. Williamson
Attorney
THE NORRIS PETERS CO., PHOTO-LITHO., WASHINGTON, D. C.

(No Model.) 9 Sheets—Sheet 9.

F. A. JOHNSON & W. E. CRANE.
MACHINE FOR PRODUCING PRINTING SURFACES.

No. 445,559. Patented Feb. 3, 1891.

WITNESSES.
A. H. Opsahl
F. D. Merchant.

INVENTORS.
Frank Amos Johnson
Walter E. Crane
by Jas. F. Williamson
attorney

THE NORRIS PETERS CO., PHOTO-LITHO., WASHINGTON, D. C.

United States Patent Office.

FRANK AMOS JOHNSON AND WALTER E. CRANE, OF MINNEAPOLIS, MINNESOTA, ASSIGNORS TO THE JOHNSON-CRANE MATRIX COMPANY, OF SAME PLACE.

MACHINE FOR PRODUCING PRINTING-SURFACES.

SPECIFICATION forming part of Letters Patent No. 445,559, dated February 3, 1891.

Application filed June 26, 1889. Serial No. 315,508. (No model.)

*To all whom it may concern:*

Be it known that we, FRANK AMOS JOHNSON and WALTER E. CRANE, citizens of the United States, and residents of the city of Minneapolis, county of Hennepin, State of Minnesota, have invented a certain new and useful Machine for the Production of Printing-Surfaces, of which the following is a specification.

The object of the machine is to produce a matrix in papier-maché or other suitable material from which to cast printing-plates by the stereotyping process, or in case intaglio-dies are used a casting mechanism might be substituted for the impression mechanism, producing logotypes, each representing a line of justified type, which can be used as ordinary type for printing, or to produce a printing-surface by stamping the letters into a plate or other material from which an impression may be taken directly, the letters standing out in relief as in an ordinary stereotype-plate, or being indented in the plate, as in copper-plate printing, according as cameo or intaglio dies are used, or the machine may be used for surface-printing.

Our invention relates to that class of machines in which parallel lines of type or dies are moved in the direction of their length until the characters desired for a line of printed matter are brought into a transverse line.

In carrying out our invention we use fonts of disconnected dies movable longitudinally of suitable guides to assemble the selected characters into a transverse line and out of their original paths of motion for condensing into a compact or justified line, a line-holder adapted to receive the selected dies at the transverse line and permit the necessary movements for condensation and distribution, and a die-distributer adapted to restore the entire line of selected dies simultaneously to their original positions in their respective fonts. The construction is such as to permit the ready correction of individual errors in the selection of dies before the impression is taken without disturbance of the other dies.

As the most common form of the machine is the one for the production of stereotype matrices, and as the other purposes for which the machine can be used are but modifications of this form, we will describe the machine as constructed for the production of stereotype-matrices, so that a person skilled in the art or science to which this invention relates may be able to make and use the same.

In the accompanying drawings similar letters refer to similar parts throughout the several views.

For convenience of reference we have made the following classification of letters:

The main frame and braces are represented by $a$ and its powers, the type-table and connections by $b$ and its powers, the condensing and impression mechanism by $c$ and its powers, the movement mechanism for the type by $d$ and its powers, the stop-setting mechanism by $e$ and its powers, the matrix-material holder by $k$ and its powers, the guiding and clamping bars by $l$ and its powers, the space-indicator by $n$ and its powers, the line register or indicator and proof-printing device by $o$ and its powers, the type and collecting-bar by $t$ and its powers, and the movement machinery, cams, shafts, levers, &c., by $v$ and $x$ and their powers.

Figure 2:
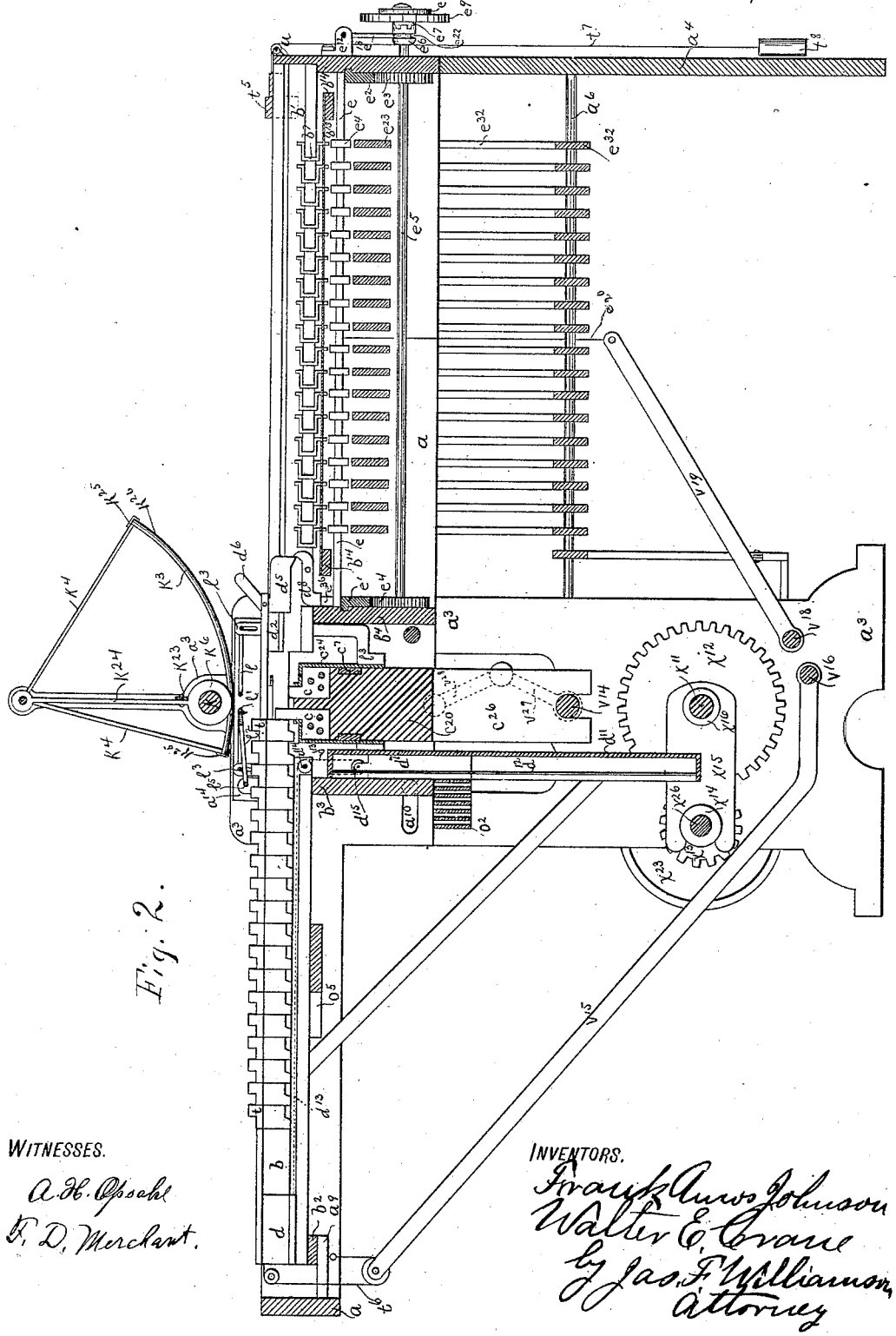
Figure 3:
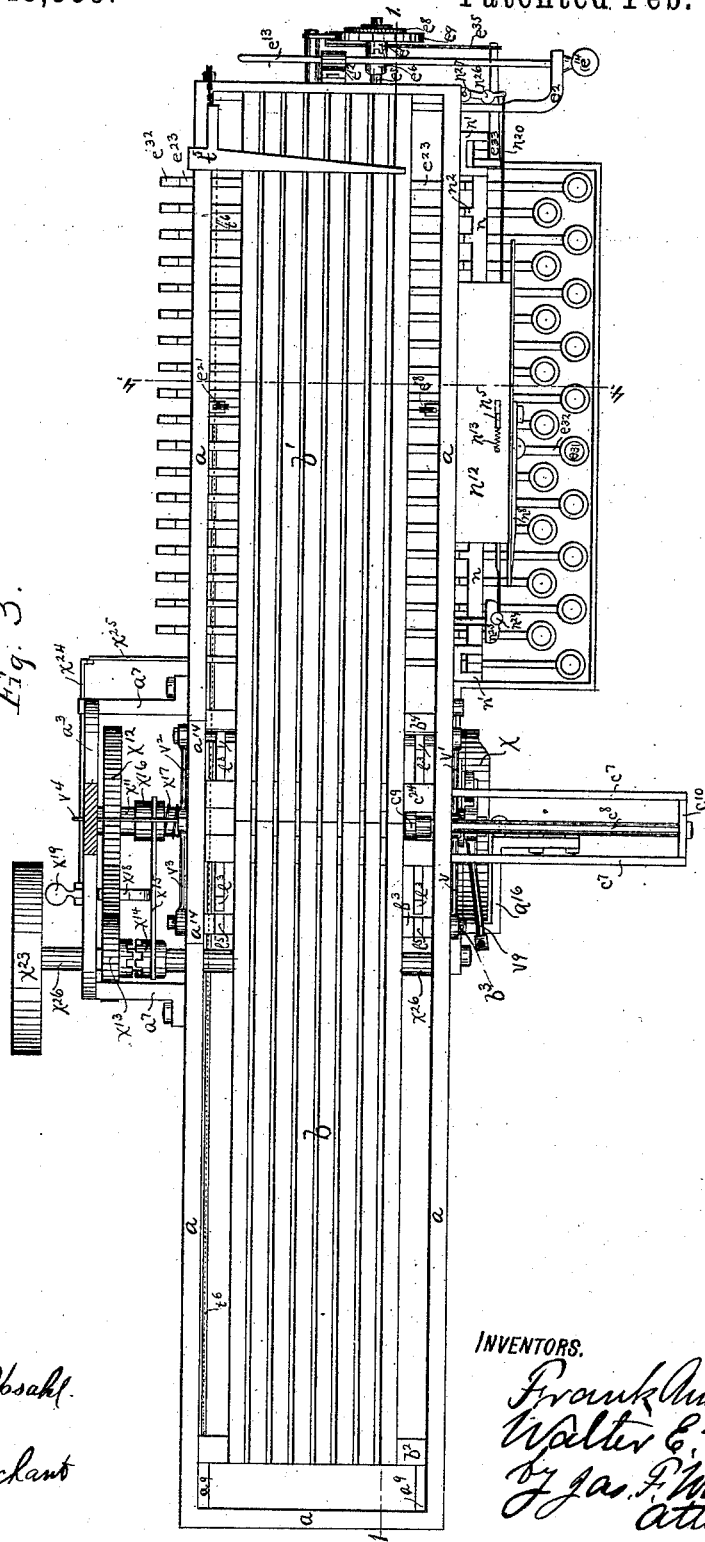
Figure 22:
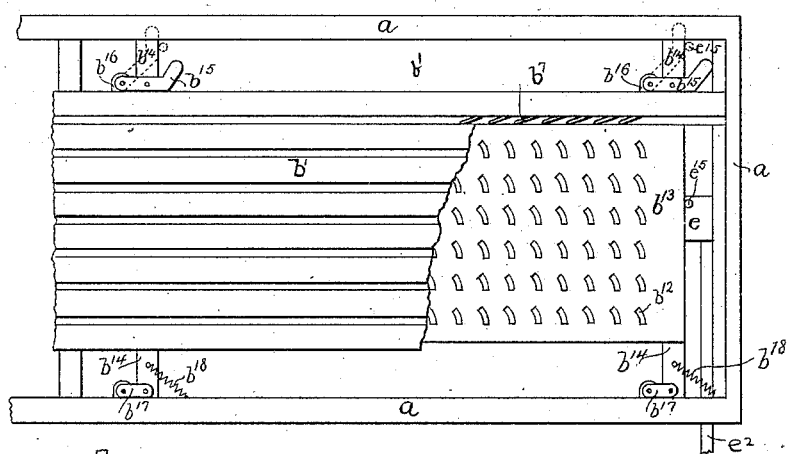
Figure 23:
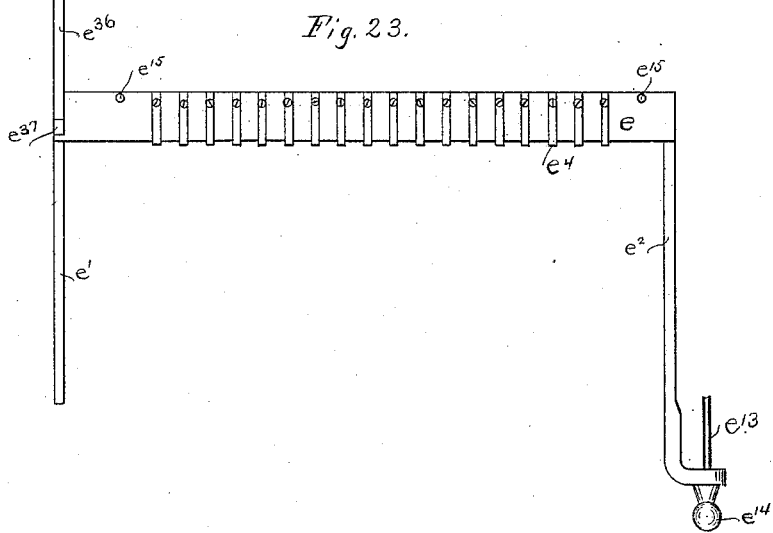
Figure 24:
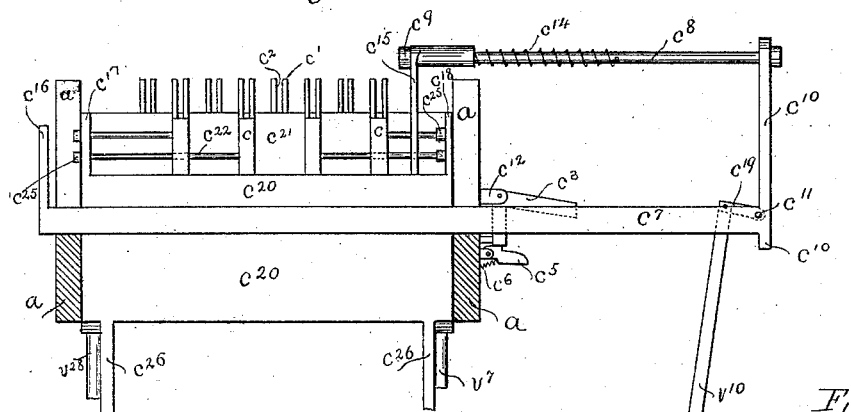
Figure 25:
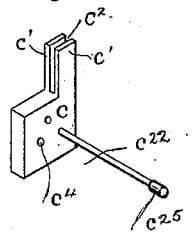
Figure 26:
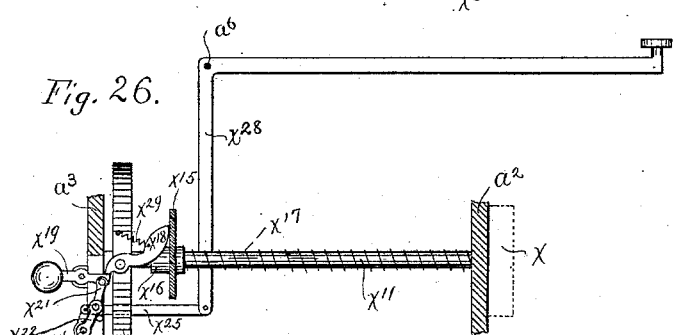
Figure 31:
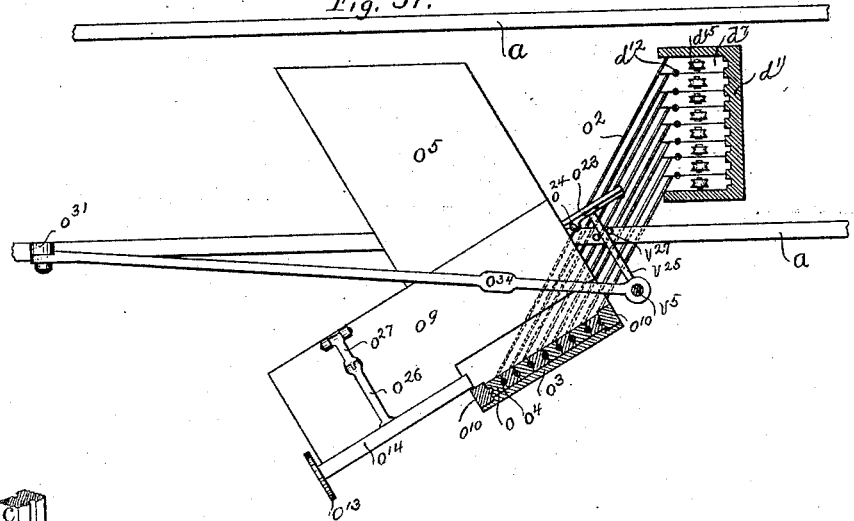
Figure 32:
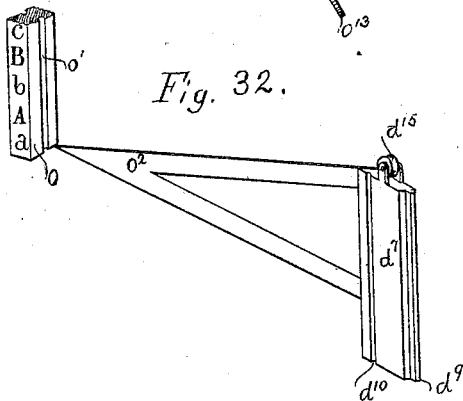
Figure 33:
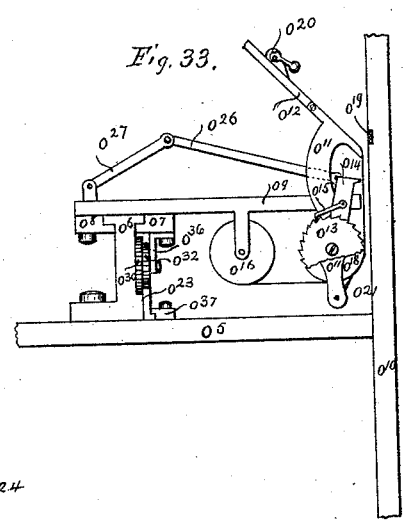
Figure 34:
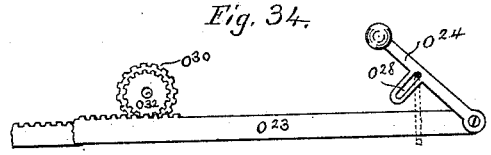

Figure 1 is a front elevation of the machine, some parts being broken away. Fig. 2 is a vertical longitudinal section of Fig. 1 along one of the type-channels, as on line 1 1 of Fig. 3. Fig. 3 is a top or plan view of the machine, the parts above the table being removed. Figs. 4 to 8, inclusive, are detail views of portions of the bars forming the type-table. Figs. 9 to 14, inclusive, are details of the type. Fig. 15 is an enlarged view of one of the push-heads, and Fig. 16 a cross-section of same. Fig. 17 is an enlarged side view of one of the stop-heads. Fig. 18 is a cross-section on line 4 4 of Fig. 3. Figs. 19 and 20 show the stop-pins and means of holding them in place. Fig. 21 is a view of the right-hand end of the main frame. Fig. 22 is a plan view of a portion of the right half of the machine, showing the returning-plate for the stop-pins. Fig. 23 is a top view of the stop-setting carriage detached. Fig. 24 is a side view of the condensing mechanism. Fig. 25 is a view of one of the holding and distributing carriers. Fig. 26 is a side view of the starting and automatic stopping device. Fig. 27 is a side view of the impression-roll and matrix-holder. Fig. 27½ is a cross-section of the impression-roll, showing the pinion and rack for moving the matrix-material holder. Fig. 28 is a view of the matrix-feeding apparatus. Fig. 29 is a top view of the clamping and check bars. Fig. 30 is a cross-section of the impression-roll and a portion of the impression-bed. Fig. 30½ is a view of a portion of the space-indicating device. Fig. 31 is a plan view of the line-indicating and proof-making apparatus, part of it being shown in cross-section. Fig. 32 is a perspective of the die and line-register actuating device. Fig. 33 is a side view of line-registering and proof-making apparatus. Fig. 34 is a view of the shifting device for the proof-making apparatus.

In order that the detailed description may be more easily understood, we will first outline the general workings of the machine.

We provide a series of parallel lines of disconnected type or dies—as many as the maximum number of letters in any line to be printed. About forty-eight or fifty will ordinarily be found sufficient. We shall for convenience of reference call each of these lines of type a "font." Each font is mounted in suitable guides and contains one letter of each of the different characters that the machine will produce, also spaces and quads, and the characters are arranged in the same order, so that the fonts are duplicates of each other. As we have constructed the machine these fonts are contained in slots or channels in a horizontal table or bed. These channels may, however, be placed in a vertical or oblique position, if desired. At the commencement of the operation the fonts are all on one-half of the table, as the left. Each font tends to move to the right by means of a cord and weight or other suitable means, but is prevented from so moving until the proper time by a pawl or dog in each of the channels. Now it is obvious that by moving the fonts to the right different distances different letters will be brought to the center of the table. The key mechanism releases the fonts successively and allows them to move to the right different distances, according as different letters are struck. For instance, suppose we want to print the word "and." The letter "a" is struck in the key-board and the first font of type (the one at the rear side of the machine) is released and allowed to move to the right until the letter "a" comes to the center of the table. As the letter "n" is struck in the key-board the second font is released and allowed to move to the right until the letter "n" stands alongside of the letter "a." The letter "d" would be chosen from the third font and brought in line with the letters "a" and "n" at the center of the table. In a similar manner enough characters are assembled in a transverse line at the center of the table to make a line of printed matter. This can be known by reference to a pointer or index, which registers the width of the letters as they are chosen on a suitable scale, the successive type or dies coming from successive fonts in the order of the choice of letters. This line of type which has been assembled at the center of the table is supported by a suitable holder and moved laterally, whereby the type are pressed close together or condensed to column width. The table is made to open at the center to allow of this lateral or transverse movement. The line of type or dies and the matrix material are forced together, forming a matrix. After the impression has been made the mechanism which supports the type returns each type to the font from which it was taken, the table is closed, and all the fonts are forced back to the left half of the table, where they are held by the dogs already referred to until released again. While one line is being condensed and the impression of the same is being made the stop mechanism, which arrests the movement of the fonts to the right, can be set or arranged for the next line. A duplicating or repeating device is added, by which the type, after making their first impression, are withdrawn, the paper-carriage moved sidewise the width of one column and the line impressed again, thus making a duplicate matrix to be used in case of accident to the first matrix in casting, or it may be preserved to be used for subsequent use. A line registering or indicating device and proof-making apparatus shows what letters have been selected and brought into the transverse line, so that any corrections or changes may be made in the line of letters selected before an impression is made of them, and it also prints each line on a suitable ribbon or sheet of paper, so the operator can see at any time all he has written, and this can be used as a proof-sheet for the matrix which has been made. Instead of making the duplicate matrix, an impression can be taken direct from the condensed line of type to be used as a proof-sheet, or the impression mechanism could be modified so that the type can be made to make one, two, or more matrices and one, two, or more proof-sheets. In case a proof is taken direct from the type the proof-printing device referred to above can be dispensed with.

The machine embodies also numerous other devices of minor importance, which will be mentioned in the detailed description and pointed out in the claims.

*The main frame.*—The main frame consists of an open rectangular box $a$, supported by three standards, two near the center $a^2$ and $a^3$, suitable for receiving the principal movement machinery, and one $a^4$ at the right-hand end. The rear central support $a^3$ is placed a little distance from the frame to make room for the gear-wheels and is joined to the main frame by means of the projections $a^7$. The keyboard is attached to the front strip $a^5$ and the rear rod $a^6$, joining the central and right-hand standards. The impression-roll, paper-carriage, &c., are supported at the front by the standard $a^{13}$, attached to the top of the main frame and at the rear by the upper end of the standard $a^3$.

*Type and type-table.*—The table or bed which supports the type is in the upper part of the main frame and is made in two sections, one movable, composed of the bars $b$, and one stationary, with the frame composed of the bars $b'$. These bars $b$ and $b'$ are thin strips of metal with broadened or widened bases placed side by side and fastened together, so that the upper surfaces or edges of the bars are a slight distance apart, leaving slots or channels $b^5$ between them, as shown in Figs. 5 and 18. In each of these channels is placed a font of the type or dies between a push-head $d$ on the left and a stop-head $d^2$ at the right, as shown in Fig. 2. The bars $b$ are attached to two horizontally-movable cross-pieces $b^2$ and $b^3$, the former resting on plates $a^9$ on the inside of the main frame and the latter extending through slots $a^{10}$ in the front and rear sides of the frame. To the ends of the cross-piece $b^3$, which projects through the slots $a^{10}$, are attached the arms $v$ and $v^3$ of front and rear toggle-joints, by means of which section $b$ of the table is moved from right to left. At one end bars $b'$ are fastened to the fixed cross-piece $b^4$ and at the other to the right end of the main frame. The ends of the bars $b$ enter slots in the ends of the bars $b'$, as shown in Figs. 4, 6, and 7, and a portion of each is cut away on the under side to make room for the condensing-carriers, as will be explained in connection with the condensing apparatus. Each type consists of a body $t$, (see Figs. 9 to 14, inclusive,) which rests on the bars $b$ or $b'$, as shown in Fig. 14, and of a projection or leg $t'$, which extends down into the channel, by means of which it is guided. The upper left-hand portion of all the type in the odd-numbered fonts and the upper right-hand portion of all the type of the even-numbered fonts are cut away to make room for the guiding and clamping bars, as will be explained farther on. The letter or character is cut on the upper surface $t^3$, as shown in Fig. 12. One half of the leg $t'$ is made longer than the other half to enable the type to be better held while the line is being condensed and the impression taken, as will also be explained farther on. The bodies of the very thin type (i's, l's, &c.) extend only half-way across the type, as shown in Fig. 11. Should two or more of these thin letters be chosen from adjacent fonts, this arrangement allows the parts of the type with the characters on to be pressed close together in the line when it is condensed. Each push-head $d$ above referred to has a rib or widened part $d'$ at the bottom, which slides in the grooves $b^{25}$ in the bars $b$. (See Figs. 14, 15, and 16.) Each stop-head $d^2$ has a similar rib $d^4$, which slides in the grooves $b^{21}$ in the bars $b'$. (See Figs. 4 and 17.)

*Stop-setting mechanism.*—The setting mechanism consists, chiefly, of stops for arresting the movement of the fonts to the right at the proper places, the stop-setting carriage, by means of which these stops are set in the channels successively, and the keyboard.

*The setting-stops.*—The widened bases of the bars $b'$ (the portion of the bars at the bottom of the channels) contain vertical slots $b^6$, in which are placed crank-shaped stops $b^7$, these stops being held in position by the adjacent bar. The upper part $b^8$ of these stops is normally contained in recesses $b^{26}$ of the bars $b'$. The lower part $b^{10}$ extends down through slots $b^{12}$ in a plate $b^{13}$, Figs. 2, 18, and 22. By moving the projection $b^{10}$ toward the front of the machine in the arc of a circle the point $b^8$ is thrown into the type-channel.

*Stop-setting carriage.*—The stop-setting carriage is composed of the horizontal bar $e$, attached to the slides $e'$ and $e^2$, the former of which slides in a groove in the cross-piece $b^4$ and the latter in a groove in the standard $a^4$, as shown in Fig. 2. On the under sides of the slides $e'$ and $e^2$ are racks engaging two gear-wheels $e^3$ and $e^4$, which are rigid with the shaft $e^5$. A weight $e^{16}$, attached to the cord $e^{17}$, passing over the sheave $e^{18}$ on the inside of the main frame, tends to move the carriage toward the front of the machine. (See Fig. 18.) A spring $e^{19}$ is interposed between the cord $e^{17}$ and its attachment to the bar $e$ to give the carriage a quick elastic movement when it is released. The carriage is prevented from moving by the escapement-pawl $e^{11}$ engaging the escapement-wheel $e^9$. The left-hand half of clutch $e^6$ slides on the shaft $e^5$, but is made to turn with it by means of a slot and pin or a feather. The escapement-wheel $e^9$ has for its axle the right half $e^7$ of the clutch, which is on the end of shaft $e^5$. It is made to turn forward with the clutch, and hence with the shaft $e^5$, by the notches in the wheel $e^8$ engaging pawls $e^{10}$, the wheel $e^8$ being rigid with a part of the clutch $e^7$. When the carriage is moved backward, the pawls $e^{10}$ slip in the notches of the wheel $e^8$ without turning the escapement $e^9$. The slide $e^2$ of the setting-carriage extends out in front of the machine and is turned to the right to form one support for the loop-shaped rod $e^{14}$, the other support being a lug or bracket $e^{12}$, attached to the main frame, through which the upper part of the rod $e^{13}$ slides. The lower part of the rod $e^{13}$ slides in a groove $e^{22}$ in the part $e^6$ of the clutch. By turning the handle $e^{14}$ to the left the loop-shaped rod $e^{13}$ is rocked and the clutch is opened and the carriage left free to move forward or backward. On the horizontal bar $e$ are placed the springs $e^4$, as shown in Figs. 2, 18, and 23. There are as many of these springs as there are stops in one channel and dies or characters in each font. Under each spring is a horizontal bar $e^{23}$, which rests in slots in the front and rear of the main frame. Near each end of the bars $e^{23}$, where they pass through the main frame, are slanting slots $e^{24}$, through which and the parts of the frame between the slots are passed the pins $e^{38}$, which support the bars $e^{23}$, so that as the bar is forced toward the operator it is raised at the same time. Each is moved forward by depressing its key $e^{31}$, attached to the key-lever $e^{32}$, which turns on the rod $a^6$ as a fulcrum and moves in slots in the strip $a^5$. In front of the main frame are bail-shaped bars $n$, (shown in Figs. 1, 18, and 21,) hinged at $n'$ to the main frame and resting against the ends of the bars $e^{23}$. In the right-hand hinge of these bails is also fulcrumed the lever $e^{33}$, which rests against the bars $n$, so as to be moved out by any of them. This lever works the escapement pawl $e^{11}$ by means of the connecting-rod $e^{35}$. The spring $e^{34}$ holds the lever to place against the bars $n$. As soon as the keys are released the springs $e^{27}$ throw the bars $e^{23}$ to the rear. The bar $e^{26}$, to which springs $e^{27}$ are attached, runs through the end of the main frame and has a ratchet-wheel $e^{29}$ attached, by turning which the tension of all the springs can be changed. A strip $a^8$, of any suitable material, on top of the slotted piece $a^5$ affords a back stop or rest for the key-levers.

*Operation of the setting mechanism.*—By depressing any of the keys the corresponding bar $e^{23}$ is raised and moved forward. The upward movement raises one of the springs $e^4$ until it stands directly behind the lower part $b^{10}$ of the stops, at which time the bar $e^{23}$ will have advanced forward enough so that the lever $e^{33}$ will draw the end of the escapement-pawl $e^{11}$ out of its notch in the escapement-wheel $e^9$, allowing it to turn one-half notch, a whole notch movement being prevented by the lower end of the pawl $e^{11}$. This allows the carriage to move forward, carrying with it the stop, leaving the part $b^8$ in the type-channel, as shown at the right in Fig. 18. As the key is released the bar $e^{23}$ retreats, and as soon as the spring $e^4$ is below the end of the stop the lever $e^{33}$ will be retracted by spring $e^{34}$ and will force the lower end of the pawl $e^{11}$ out of its notch, allowing the wheel to turn one-half step more. By this movement of the carriage the inclined surface $e^{37}$ of the bar $e^{36}$, attached to the slide $e'$ of the carriage, strikes against the left end of the dog $d^3$ of that channel, raising it, whereby the stop-head $d^2$ is released and allows the font of type to move to the right until the stop-head is arrested by the stop which has just been set in the channel. Each key, its lever, the corresponding bar $e^{23}$, and the corresponding transverse row of stops represents a different letter or character, so that by striking any key the font of type which is released will move to the right, leaving the corresponding die in the transverse line. The lower part $b^{10}$ of the type-stops $b^7$ projects down through slots $b^{12}$ in the plate $b^{13}$, as shown in Figs. 2 and 18. This plate is attached to the cross-pieces $b^{14}$, which move in horizontal slots $a^{17}$, Fig. 1, in the front and rear sides of the main frame, said cross-pieces being connected by swinging supports $b^{15}$ at the rear and $b^{17}$ at the front to the frame. The slots $b^{12}$ allow any of the pins $b^7$ to be moved out into the type-channels. As the stop-setting carriage is moved back to the rear of the frame two pins $e^{15}$ on the bar $e$ strike against the bent levers $b^{15}$, which are fastened to the cross-pieces $b^{14}$ and are fulcrumed at $b^{16}$ on the first or rear type-bar $b'$ and carry the plate $b^{13}$ to the rear, returning any of the stops which may have been set to their original positions. The length of the levers $b^{15}$ and swinging supports $b^{17}$ from their fulcrum to their point of attachment on cross-pieces $b^{14}$ is equal to the length of the horizontal part or radius of one of the stops, so that as the plate $b^{13}$ is moved to the rear it swings in the arc of a similar circle with the stops. This allows the plate $b^{13}$ to be made with smaller slots, and consequently greater strength, than if it did not swing through the proper arc, the slots being just large enough to allow the ends of the stops $b^{10}$ to move in them freely. The carriage is moved back farther than is absolutely necessary in order to insure the plate $b^{13}$ and other parts having a full movement every time. The dotted lines in Fig. 22 show position of the lever-arms $b^{15}$ while this excessive motion is taking place. As the carriage returns to the first channel the springs $b^{18}$ draw the plate back to its normal position, so that the stops can be set again. Should any of the stops be set in any of the channels at the left of the one previously used before the fonts are returned to their position on section $b$, the hinged part $d^5$ of the stop-head $d^2$ will rise, allowing it to pass over the stops without throwing the stops out of position, and the stop-head will be engaged by the stop when the font again moves to the right. This is the device which allows the stops to be adjusted while the impression of the preceding line is being made, and also enables individual errors in the selection of dies to be corrected without disturbance of the other fonts. The pointer $o^{29}$, Fig. 1, indicates on a suitable scale on the slide $e^2$ of the setting-carriage the channel at which the stop-setting mechanism is situated. From the scale $o^{23}$ of the line-register can be determined the channel in which the error occurs. By moving the stop-setting carriage to the corresponding channel by aid of the pointer $o^{29}$ the correct stop can be set by striking the proper key. If the new stop is at the right of the one previously set, the font can be released by raising the hinged part $d^5$ of the stop-head above referred to, when the type-weight will carry the font to the right until engaged by the new stop. If the new stop is at the left of the one previously set, the change can be made by simply pushing the font back in its channel until the hinged part $b^5$ passes beyond the new stop.

*The collecting-bar.*—The fonts of type are forced back to their normal position by the collecting-bar $t^5$, which is moved by means of the lever-arm $v^{15}$, to which it is attached by the cord $t^6$. ($t^6$ is represented in Fig. 3 by dotted lines.) The collecting-bar is returned to its position at the right end of the machine by the cord $t^7$ and the weight $t^8$.

*Condensing or compacting and distributing mechanism.*—The type-channels being the same distance apart, it follows that in the transverse line of type which is assembled at the center of the table each die occupies the same amount of space. An impression may be made of the line as it is thus assembled which would resemble the work of an ordinary type-writer, each letter occupying the same space and the ends of the lines uneven; but for ordinary printing, as in newspaper or book work, the dies in the line need to be condensed or forced together into a compact or justified line, and after impression to be distributed or returned to their respective fonts in time for use, if necessary, in the next succeeding line. To these ends we provide a line-holder suitable to hold or support the transverse line of dies while they are being forced together and a die holder and distributer suitable for attaching to the individual dies and returning them to their respective fonts. While the means we herewith describe we deem best adapted to these purposes, it is evident that other mechanical means might be substituted, and we do not wish to confine ourselves to the mechanism herein described. Extending across the machine from front to rear, immediately under the joining of the two sections $b$ and $b'$ of the type-table, is the impression-bed $c^{20}$. This bed is supported by two legs $c^{26}$, one at front and one at rear, which have slots cut in the bottom of them to set on the shaft $v^{14}$, as shown in Fig. 2. These slots allow a slight upward movement of the bed, which is accomplished by means of the front and rear pairs of toggle-joints $v^7 v^8 v^{28} v^{29}$. The bed is moved to the left by front and rear pairs of toggle-joints $v\ v'\ v^2\ v^3$, the pins $c^{27}$ at the front and $v^4$ at the rear working in vertical slots $c^{28}$ in the ends of the bed. Upon this bed, arranged in two rows, are the die carriers and distributers $c$, there being one carrier for each font of type. The ends of the bars $b$ and $b'$ are cut away, as shown in Fig. 4, leaving a recess $b^{24}$ on each side of the type-channels, into which the upward-projecting parts $c'$ of the carrier $c$ are placed, so that the slots $c^2$ of the carriers are in coincidence with the type-channels, and as each font of type moves to the right the projections $t'$ of the type must pass through these carriers. The carriers are held in position by means of plates $c^{24}$, which inclose the outer and upper sides, the inner and under sides resting against and on the bed $c^{20}$. These carriers $c$ have a movement from front to rear and return during the condensing of the dies for each line. They are returned exactly to place in coincidence with the type-channels by means of the wires or rods $c^{32}$, one of which is fastened to each carrier $c$ and extends through the intervening carriers to the front and rear of the machine, terminating in a head $c^{25}$, which abuts against the opposite sides of stationary plates $c^{17}$ and $c^{18}$ on one side and against opposite sides of movable gathering-plates $c^{15}$ and $c^{16}$ on the other. We prefer to have the wires from one half of the carriers extend to the rear and from the other half to the front of the machine, though they may all extend to one side if deemed best. The movable plate $c^{16}$ is attached to and made a part of the condensing-carriage $c^7$, and the plate $c^{15}$ is attached to condensing-rod $c^8$ by means of its sleeve and is drawn back by the head $c^9$ of the condensing-rod $c^8$ and is pushed forward by the spring $c^{14}$. After a line of type has been selected and assembled at the center of the table the projections $t'$ of the type in the line assembled will be found in the slots $c^2$ of the carriers $c$, the type of the odd-numbered fonts in the right-hand row and the type of the even-numbered fonts in the left-hand row of carriers, the part $t^3$ of the type coming directly over the part $c^{21}$ of the bed $c^{20}$, which separates the two rows of carriers. The whole bed is now raised, so that the projections $t^2$ of the type enter the space between the part of the bed $c^{21}$ and the upward projecting rib $c^{23}$ of the plate $c^{24}$, the corners of the projection $t^2$ of the type being cut away to insure the type always getting into their proper places. The guiding and clamping bars $l$ and $l'$ are dropped astride the line of type, as shown in Fig. 30. Sections $b$ and $b'$ of the table are separated enough to make room for the die-holders or distributing-carriers $c$, with type $t$, to pass freely between the bars $b$ and $b'$. This lateral movement of the line of type is effected by the condensing-rod $c^8$, operated by the lever $v^{10}$, and forces the selected characters together into column width. The head $c^9$ of the condensing-rod strikes against the type. The plate $c^{15}$ helps by gently pushing the carriers together, being made elastic by means of the spring $c^{14}$ on the rod $c^8$. Ordinarily the head $c^9$ is pushed in only until it comes into the edge of the column, it being stopped by the arm $c^3$ striking against a pin $c^{11}$, the lever-arm $v^{10}$ being made elastic. If the aggregate width of the letters in the line of dies selected is less than the width of a column, the extra space may be taken up by flexible spaces, as a piece of rubber or a spring on the side of the spacing-quads, so as to justify the line of type. When it is necessary for the plunger to enter farther to condense the partial line, as at the end of a paragraph, the arm $c^3$ is raised before starting the machine in motion, so that the pin $c^{11}$ will not be engaged. It is held up by the dog $c^5$ until the head $c^9$ gets beyond the edge of the column, when the downward projection of $c^{10}$ strikes the inclined surface of the dog $c^5$, releasing the bent lever $c^3$, so that it will stop the carriage at the edge of the column for the next line. The type, after being pressed together, are impressed into the matrix material $k^{26}$, which is fastened to the under side of the holder $k^3$, by means of the flanges $k^{25}$ or in any other suitable manner. This impression is given by further upward movement of the bed $c^{20}$.

*The guiding and clamping bars.*—During the compacting of the dies and while returning to place they need to be prevented from tipping from right to left and during the making of the impression to be rigidly held in alignment. For these purposes there are provided two bars or frames $l$ and $l'$, called "clamping-bars." These are attached by means of slotted posts $l^3$ to the bed $c^{20}$, making them move to the right or left with the bed, and are attached to the main frame $a$ by means of slots in the pieces $a^{13}$ and $a^{14}$, which are secured to the top of frame $a$ and which control the heights of the parts $l^{11}$ of the bars $l$ and $l'$. The slots $a^{15}$ in pieces $a^{13}$ and $a^{14}$ are ⌐-shaped, and when the last downward movement of the bed $c^{20}$ takes place the parts $l^{11}$ are pulled down in the vertical portion of the slots $a^{15}$ by the posts $l^3$, the movement of $l^{11}$ in the slots of posts $l^3$ having all taken place during the rise of the bed to make impression and return, leaving $l^{11}$ at the upper end of said slots at the beginning of the final downward movement of the bed. During the final downward movement of the parts $l^{11}$ the parts $l^6$ and $l^7$, Fig. 29, act as fulcrums on parts $a^{11}$ and $a^{12}$, which are attached to $a^{13}$ and $a^{14}$, by this means tipping up the bars $l$ and $l'$ to a position shown by the dotted lines in Fig. 30 for the purpose of clearing the type during the rearrangement for another line. With the first upward movement of the bed the arms $l^3$ rise, allowing the bars $l$ and $l'$ to turn on $a^{12}$ and $a^{11}$ as fulcrums, dropping the bars $l$ and $l'$ on the line of type, as shown in Fig. 30. When the bed $c^{20}$ is raised to its highest position to make the impression, the clamping-bars are brought up to a horizontal position, as shown by the dotted lines in Fig. 30, holding the type tightly; but when the bed is partially lowered the type and bars are in the position indicated by full lines, leaving the type free to move between the bars and guiding them for the condensing and return movement. As the impression-bed and section $b$ are moved to the left, the parts $l^{11}$ slide in the horizontal parts of the slots $a^{15}$. Attached to and rigid with the bars $l$ and $l'$ are the projections $l^9$, connected together by the spring $l^{10}$ for the purpose of forcing down the bars $l$ and $l'$ and the type when the downward movement of the bed occurs.

*Check-bar.*—Rising from the cross-piece $b^3$ of table $b$ are two posts $l^5$. To the upper part of these is hinged the frame or check-bar $l^2$, which has a thin edge $l^{14}$ lying just below and to the left of the bar $l'$. In its normal position this check-bar is held up by the lips $l^{13}$, resting on the bar $l'$. When the bar $l'$ is lowered, the check-bar $l^2$ descends with it between the line of type selected and the portions of the fonts remaining on section $b$, and as section $b$ is moved to the left this check-bar carries the portions of the fonts with it, resisting and overcoming the force of the weights $d^7$. When the movement to the left takes place, the check-bar being moved farther than the clamping-bars, the lips $l^{13}$ are moved off the bar $l'$, so that the check-bar will not be raised by $l'$ when the bed and clamping-bars are raised to make the impression; also, the ends $l^{15}$ of the bar $l^2$ are drawn under the plates $a^{11}$ as a further means of security. After the impression of the line has been made the return movement of the condensing-carriage and plunger sets each of the carriers $c$ with its type opposite its type-channel, as already explained. As sections $b$ and $b'$ come together, the tongue $b^{19}$, having wedge-shaped ends $b^{20}$, pass between the carriers, as shown in Fig. 7, and enter vertical slots $b^{11}$ in the bars $b'$. The wedge-shaped plates $b^{22}$ of the bars $b$ pass between the type and enter the horizontal slots $b^{23}$ in the bars $b'$. These centering devices insure the carriers and type getting back to their proper places in line with the type-channels.

*Impression-roll and duplicating apparatus.*—The impression-roll $k$ turns in suitable bearings in the standards $a^{13}$ and $a^3$. On this roll $k$ is an impression-sleeve $k'$, to which is attached a pinion $k^2$, Fig. 27½, to move the matrix-material holder $k^3$ by means of the segmental rack $k^{15}$. The holder is supported by two arms $k^4$, attached to a sleeve $k^5$ on the rod $a'$, joining $a^{13}$ and $a^3$. The impression-sleeve $k'$ is made to turn the roll $k$ by means of a feather. The impression-roll is located and the material moved forward for each line by means of the mechanism shown in Fig. 28. The ratchet-wheel $k^7$ is attached to the roll $k$ and prevented from turning backward by the pawl $k^{10}$, which is pivoted to $a^3$. Hanging on the axis of $k$ is the bent lever $k^8$, to which is attached the gravity-pawl $k^9$. A plate $k^{11}$ is hinged at $k^{14}$ to the lower end of the lever and held in the desired position by the thumb-screw $k^{12}$. A pin $v^4$ from the arm $v^3$ of the toggle-joint extends out through the slots $k^{13}$. As the toggle-joint $v^2$ $v^3$ is worked to open and close the table the pin $v^4$ traverses the slot $k^{13}$. By turning the plate $k^{11}$ so that the arc of the slot $k^{13}$ does not coincide with the path of the rod $v^4$ the lever $k^8$ will be moved a greater or less distance, according as the plate $k^{11}$ is set. In this manner the material can be moved one, two, or more lines, making the matter solid or leaded, as desired. The impression-sleeve and paper-carriage are moved over for duplicate column on the impression-roll by means of the device shown in Fig. 27. The sleeve $k^{15\times}$ is moved down and up by the lever-arm $v^5$, as will be hereinafter explained. By its first downward movement the swinging pawl $k^{16}$ engages the pin $k^{19}$, moving it around, whereby the segment gear-wheel $k^{20}$ turns the segment gear-wheel $k^{21}$, throwing the lever $k^{22}$ over. This acts on the connecting-rod $k^{23}$, which is attached to the collared sleeve $k^6$ or the brace $k^{24}$, and draws the impression-sleeve toward the rear of the machine. By the upward movement of the sleeve $k^{15}$ the pawl $k^{16}$ is withdrawn from the pin $k^{19}$, and the pin $k^{18}$ being then at the top will be engaged by it in its next downward movement, when the lever $k^{22}$ will be reversed and the impression-sleeve thrown back to its original position. In this manner one line is printed in the original column and then in the duplicate. The next line is printed first in the duplicate column and then in the original, and so on alternately. The lever $k^{22}$ may be provided with holes or a slot to make provision for different-width columns. This duplicating or repeating device is not an essential part of our machine. Instead of making the second matrix, paper may be substituted for the matrix material, an inked ribbon or carbon paper interposed, and a proof taken direct from the line of type.

*Space-indicator.*—As before stated, the dies are all multiples of some unit. We have provided an indicator which registers the width of each die as it is brought into the transverse line. The object of the indicator is to exhibit to the operator the aggregate width of dies assembled and also the amount of space remaining in the line, and also to aid in tabular work. Hinged at $n'$ and hanging in front of the bars $e^{23}$, are the swinging bars $n$, as shown in Figs. 1, 18, and 21. These bars have projections $n^2$, which rest against the bars $e^{23}$. Each bar $n$ can thus be made to represent a certain number of units, the projections $n^2$ from that bar being so located as to rest against all the bars $e^{23}$ which represent letters of that width or a number of units, so that when any two-unit letter is struck one of the bars $n$ will be forced to the front and when any three-unit letter is struck another of the bars $n$ will be forced to the front, and so on. In the drawings we have shown but two of the bars $n$. About five or six are ordinarily required. As the bars $n$ are moved forward the inclined surface $n^3$ of the projection $n^4$, as shown in Fig. 30½, strikes against the arm $n^5$ and forces it to the right. The pawl $n^6$, attached to the lever-arm $n^5$, moves the segmental ratchet $n^7$, which is attached to the pointer $n^8$, moving over a graduated scale $n^{14}$. The arm $n^5$ extends up through a slot in the support $n^{12}$ and is drawn back to the left by the spring $n^{13}$. A set of stationary pawls $n^{10}$ prevents the pointer from being drawn back. The pawls $n^6$ and $n^{10}$ may be single; but we prefer differential pawls. It will be noticed by referring to Fig. 30½ that the inclined surface $n^3$ will not strike the bar $n^5$ until it has moved about one-third its distance, and that the full movement of $n^5$ is effected by the second-third movement of $n^4$. So by a two-thirds stroke of the key one is sure of the full count of the register, while a mere touch or accidental stroke up to one-third of a full stroke will not be registered at all. This also allows one key to be partially depressed before the previous one has fully returned to place. The pointer $n^8$ will show at all times the aggregate width of the dies which have been selected. On the under side of support $n^{12}$ is attached the support $n^{21}$ for the angular piece $n^{22}$, carrying the bell-hammer $n^{24}$, which is made to strike against the bell $n^{25}$ when the dog $n^{23}$ leaves the piece $n^{22}$. The bell is made to ring when the pointer lacks several units of enough to fill up the line. The pendent dog $n^{23}$ allows the pointer to return without ringing the bell. The piece $n^{16}$ is fulcrumed on the same pin as the pawl $n^6$ and has a pin $n^{17}$ extending forward under the pawls. A piece $n^{15}$ is similarly fixed with reference to the pawl $n^{10}$. The bar $n^{19}$ is pivoted to piece $n^{15}$ and has a slot in it through which projects the pin from the piece $n^{16}$. The slot allows piece $n^{16}$, together with the bar $n^5$, to move to the right. By drawing the rod $n^{20}$ to the right the pins $n^{17}$ and $n^{18}$ are raised, releasing the pawls $n^6$ and $n^{10}$ from the segmental ratchet $n^7$, when the weight $n^9$ will return the pointer $n^8$ to the zero-mark. The rod $n^{20}$ is drawn to the right by the inclined surface of slide $e^2$ striking against the lever $n^{26}$, which is hinged at $n^{27}$ to the main frame. (See Fig. 21.)

*Line-register and proof-printing mechanism.*—In order that the operator may know just what letters have been selected and assembled under the impression-roll and thus be able to correct any mistakes or make any changes before the impression is made, a line register or indicating apparatus is provided. As a letter is struck in the key-board a corresponding letter appears in the horizontal slot $o^{17}$ above the graduated scale $o^{22}$, which indicates the channels from which the letters were taken, so that by the aid of the pointer $o^{29}$ on a suitable scale on the slide $e^2$ of the setting-carriage the setting mechanism may be moved to the proper channel and the corrections made, as already stated. At the same time that the line of type is being impressed into the matrix material the paper-holder $o^{12}$ moves to the right and receives an impression of the line. The operator thus has before him a copy of all he has written, and as soon as a column of the matrix has been made a proof-sheet is ready for the proof-reader. To these ends a series of parallel bars $o$ are provided, having grooves $o'$ in their sides. These bars are made to slide on the wires $o^4$ in the frame $o^{10}$. The frame $o^{10}$ is attached to the bed $o^5$, which passes under the bars $b$, and is securely fastened to these bars, so as to move with them. The bed $o^5$ and the frame $o^{10}$ are placed at an angle with the main frame, so that the proof-sheet and line in the slot are nearly squarely facing the operator. The bar at the left is attached to the weight $d^7$ of the first channel by means of a braced arm $o^2$. The bar next to the right is attached in like manner to the weight of the second channel, and so on, there being as many bars as type-channels. Each bar $o$ has printed on its front surface with good clear type all the letters or characters the machine will produce. As the first key is struck (suppose, for illustration, it is the letter "m") the first font is released and moved to the right until the letter "m" is under the impression-roll, as already explained. The downward movement of the weight $d^7$, which moves this font, carries with it the first bar $o$ and leaves the letter "m" in plain sight in the horizontal slot $o^{17}$. In this manner as fast as the dies are assembled under the impression-roll corresponding letters appear in the slot $o^{17}$. The reverse surface or rear side of the bars $o$ is provided with raised type corresponding to the characters printed on the face of the bar. A sliding table $o^9$, Fig. 31, carrying the paper-holder, a roll of paper, impression mechanism, &c., is fastened to an upright piece $o^6$ by means of two strips $o^7$ and $o^8$. These strips extend across the whole length of the table $o^9$. $o^6$ is attached to the plate $o^5$. The paper-holder $o^{12}$ is held in position by means of the two braces $o^{11}$. The two braces $o^{11}$ extend below the table $o^9$ and afford bearings for the shaft of the feed-roll $o^{18}$ and the spring-plate $o^{21}$. The impression-bar $o^{14}$ swings from the axes of the roll $o^{18}$, and one end has attached to it the pawl $o^{15}$, which turns the feed-roll by means of the ratchet-wheel $o^{13}$. The paper passes from the magazine-roll $o^{16}$ through between the feed-roll $o^{18}$ and the metal plate $o^{21}$ upward past the impression-bar $o^{14}$, and is fastened under the plate $o^{20}$, which is drawn up the inclined surface of the holder $o^{12}$ by the cord $o^{33}$, to which is attached a weight. (Not shown.) By the downward movement of the arm $v^9$, Fig. 1, the collar $v^{24}$, attached to the rod $v^5$, strikes against the lever $o^{34}$, hinged at $o^{31}$ to the main frame, overcoming the force of the spring $o^{35}$, which holds it up and brings it down on the toggle-joint $o^{26}$ $o^{27}$ on top of the table $o^9$ and drives the impression-bar $o^{14}$ out, impressing the paper onto the line opposite the slot $o^{17}$. As the bars descend they pass over an inked pad or surface $o^{19}$, extending across the rear of the frame $o^{10}$. On the edge of impression-bar $o^{14}$ is a strip of rubber or other flexible substance, which enables a good clear impression to be taken from bars having hard-surface type. Rubber type may be substituted for metallic on the bars. An inked ribbon may be interposed between the type and the paper and an impression obtained from it, thus doing away with the inked surface $o^{19}$. In this manner two or more rolls or sheets of paper may be run through with carbon-paper between them, producing duplicate copies of the proof-sheets, if required. The table $o^9$ is moved to the right to allow the impression of the line on the proof-sheet, as follows: The rod $v^5$, Fig. 1, has a branch $v^{25}$, which passes between two guide-posts $v^{27}$ on top of the main frame, Fig. 31, and enters the slot $o^{28}$ in the lever-arm $o^{34}$, Fig. 34. As the rod $v^5$ is drawn downward the bar $o^{23}$ is drawn to the right until the lever $o^{24}$ reaches a horizontal position. Two gear-wheels $o^{32}$ and $o^{30}$, $o^{30}$ being slightly larger than $o^{32}$, are fastened together and placed as shown in Fig. 33. $o^{30}$ moves in a rack on $o^6$, and $o^{32}$ engages the movable rack $o^{23}$. The two wheels are fastened to the movable top $o^9$ by means of a brace $o^{36}$. Now it is evident that by drawing the movable rack $o^{23}$ one inch to the right the top $o^9$ and all parts connected with it will be moved several inches to the right. The slot $o^{28}$ allows of a further downward movement of the rod $v^5$, which is necessary to give the impression without moving $o^9$. $o^9$ is returned by a cord and weight. (Not shown.)

*Mechanical movements.*—All the movements connected with the machine are automatic except the operating of the bank of keys to select the desired dies and the starting-key to set the machine in motion. These movements are all generated primarily from the compound cam-wheel $x$. Passing through the central supports $a^2$ and $a^3$ and having suitable bearings therein are the shafts $x^{11}$, $x^{26}$, $v^{14}$, $v^{16}$, and $v^{18}$. The shaft $x^{26}$ is the power-shaft, and is driven continuously by any suitable motor acting on the pulley $x^{23}$ or in any other desired manner. The shaft $x^{11}$ is the movement-shaft and produces all the necessary movements by one revolution, after which it is stopped automatically.

The movements generated by one revolution are as follows:

First. The wheel $x^2$ is raised slightly by cam-surface $x^8$. This raises the bed slightly by means of the front and rear toggle-joints $v^7$ $v^8$ $v^{28}$ $v^{29}$, so that the type rest in the die-holders and distributers and are slightly raised, so as to clear the table. The same upward movement of the bed lowers the check-bar and clamping-bars, as already explained.

Second. The wheel $x^4$ is forced outward by the cam-surface $x^9$ tipping the shaft $v^{18}$, which runs to the rear of the machine and has attached to it the lever $v^{19}$, to the end of which is attached the cord $e^{20}$, which passes over the sheave $e^{21}$ on the rear of the main frame and is attached to the setting-carriage $e$, by means of which the carriage is returned quickly to its position at the first channel. This movement of the carriage permits the space-indicator to return to its first or zero position, as already explained, and also returns the setting-stops.

Third. The cam-surface $x^9$ next strikes the roller $x^3$ and forces to the right the lever $v^{11}$, which is connected to the toggle-joints $v$ $v'$ and $v^2$ and $v^3$, the latter at the rear of the machine. The arms $v'$ and $v^2$ are attached rigidly to the same shaft, and the lower part of lever $v'$ is connected to $v^{11}$ by bar $v^{20}$. The pin $c^{27}$ extends through a slot in the main frame, working in a vertical slot $c^{28}$ in the bed $c^{20}$. The parts $v$ and $v^3$ are attached to cross-piece $b^3$ of section $b$, and thus these toggles move the bed and section $b$ to the left.

Fourth. The face-cams $x^7$ and $x^{37}$, acting simultaneously on the two rolls $x^{33}$ and $x^{34}$, work the lever $v^{10}$, which controls the condensing-carriage. The lever $v^{23}$ is added to keep links $v^{21}$ and $v^{22}$ parallel with the shaft $x^{11}$. The lever $v^{10}$ and parallel lever $v^{23}$ have their fulcrums in the plate $a^{16}$.

Fifth. Cam-surface $x^9$ strikes the roll $x^2$, straightening out the toggle-joint $v^7$ and $v^8$, and a corresponding one at the rear of the machine $v^{28}$ and $v^{29}$, worked by the shaft $v^{14}$, raising the bed and impressing the dies into the matrix material.

Sixth. Cam-surface $x^9$ strikes roll $x'$, drawing down the lever-arm $v^9$ and rod $v^5$, changing the column and operating the line-register and proof-printing device.

Seventh. Cam-surface $x^{10}$ strikes the roll $x^2$ and makes the second impression. $x^{10}$ extends across only one-half the surface of $x$, so that it does not strike the rolls $x'$, $x^3$, $x^4$, $x^5$, and $x^6$.

Eighth. Cam-surface $x^9$ strikes roll $x^6$, throwing back the lever $v^{11}$ and closing the table, being the reverse of the third movement.

Ninth. The cam-surface $x^9$ strikes the roll $x^5$, drawing down the lever $v^{15}$, which moves the collecting-bar to the left, returning all the fonts to section $b$. The collecting-bar returns by a weight $t^8$ as soon as the cam allows $x^5$ to retreat.

Tenth. Roll $x^3$ drops from cam-surface $x^{82}$ to the normal surface of the cam, producing a movement the reverse of the first, lowering the bed and raising the clamping and check bars. On the shaft $x^{11}$ is the gear $x^{12}$, and pivoted in this gear is the lever $x^{18}$. Attached loosely to the shaft $x^{11}$ by means of the sleeve $x^{16}$ is the shipper-plate $x^{15}$, which controls the half-clutch $x^{14}$, which is attached to the shaft $x^{26}$ by means of a feather, which allows it to slip freely longitudinally, and thus to engage the similar half-clutch on pinion $x^{13}$, which is loose on shaft $x^{26}$ and is revolved only when engaged by clutch $x^{14}$. The shipper-plate is pressed toward the gear $x^{12}$ by a spring $x^{17}$. Pivoted in standard $a^3$ is the gravity-stop $x^{19}$, supported and controlled at its front end by the toggle-joint composed of parts $x^{21}$ and $x^{22}$. The lower part of $x^{22}$ is firmly attached to shaft $x^{24}$, which terminates in a crank which is connected by rod $x^{25}$ to a starting key-lever. As shown in Fig. 3, the mechanism is thrown out of gear, and the shaft $x^{11}$ would not revolve if $x^{26}$ were started; but when the starting-key is depressed lever $x^{18}$ is deprived of its support, when the spring $x^{29}$ is immediately overcome by the stiffer spring $x^{17}$ moving the shipper-plate $x^{15}$ forward, causing clutches $x^{13}$ and $x^{14}$ to engage, and thereby starting gear $x^{12}$ and cam-wheel $x$. By means of a ball on the end of the lever $x^{19}$ it is returned to its original position, as shown, as soon as the lever $x^{18}$ passes below it, and is in position to intercept $x^{18}$ when it has made one revolution and stop the mechanism by $x^{18}$ overcoming the spring $x^{17}$, and thus opening the clutches.

We have shown and described our machine as constructed for the production of matrices; but, as is hereinbefore stated, the principle of the invention, so far as relates to the assembling and distributing of dies, is equally applicable to the production of raised impressions or to the production of logotypes or lines of stereotype-plate, and all terms herein used—such as "dies," "impressions," and "impression material," are used in a sense broad enough to include all these purposes.

Having thus described our invention, what we claim is—

1. The combination, with a series of guides, of a corresponding series of fonts of disconnected dies mounted in said guides, said fonts being movable therein to assemble the selected dies into a transverse line.

2. The combination, with a series of guides, of a corresponding series of fonts of disconnected dies mounted in said guides and movable lengthwise thereof to assemble the selected dies into a transverse line, and means for moving the selected dies, and those only, out of their original paths of motion for condensation into a compact line.

3. The combination, with a series of guides, of a corresponding series of fonts of disconnected dies mounted in said guides movable lengthwise thereof to assemble the selected characters into a transverse line, means for moving the selected dies, and those only, out of their original paths of motion for condensation into a justified line, and means for returning the selected dies directly to their original positions in their respective fonts after impression.

4. The combination, with the guides, of the fonts of disconnected dies movable lengthwise thereof to assemble the selected dies into a transverse line, and a line-holder adapted to receive the selected dies, and permit their condensation into a compact line and the distribution of the same after impression.

5. In a machine for producing printing-surfaces, the combination, with a series of guides, of fonts of disconnected dies, said fonts being movable therein, and a die-distributer adapted to restore the entire line of selected dies simultaneously to their respective fonts after impression.

6. The combination, with a series of guides, of a corresponding series of fonts of disconnected dies movable longitudinally of said guides to assemble the selected dies into a transverse line, condensing mechanism adapted to condense the selected dies into a compact line, and a die-distributer adapted to restore the whole line of selected dies simultaneously to their respective fonts after impression.

7. The combination, with a series of guides, of a corresponding series of fonts of disconnected dies movable lengthwise thereof to assemble the selected dies into a transverse line, a line-holder adapted to receive and guide the selected dies in their transverse movement, a condensing device for moving the dies lengthwise of the line-holder to condense the dies into a compact line, and a die-distributer for restoring the whole line of selected dies simultaneously to their respective fonts after impression.

8. The combination, with a series of guides, of a corresponding series of fonts of disconnected dies movable longitudinally of said guides to assemble the selected dies into a transverse line, condensing mechanism adapted to condense the selected dies into a compact line, and a die-distributer adapted to distribute the whole line simultaneously, comprising a series of independent carriers, one for each of the selected dies, having differential movements for returning the dies to their respective fonts.

9. The combination, with the guides, of the fonts of disconnected dies movable lengthwise of the guides to assemble the selected dies into a transverse line, a line-holder adapted to receive the selected dies and permit their condensation into a justified line, an impression material, and an impression device for forcing together the impression material and the compacted line of selected dies.

10. The combination, with the guides, of the fonts of disconnected dies movable lengthwise of the guides to assemble the selected dies into a transverse line, a line-holder adapted to receive the selected dies and permit their condensation into a justified line, an impression material and an impression device for forcing together the impression material and the justified or compacted line of selected dies, and a die-distributer adapted to restore the whole line of dies simultaneously to their respective fonts.

11. The combination, with a series of guides, of a corresponding series of fonts of disconnected dies movable in said guides, and stops movable into the paths of motion of said fonts at different points to stop the same in proper relative positions to assemble the selected dies into a transverse line.

12. The combination, with a series of guides, of a corresponding series of independently-movable fonts of disconnected dies mounted in said guides, and independently-controllable stop devices for stopping said fonts in a proper relative position to assemble the selected dies into a transverse line, whereby any error in the selection of an individual die may be corrected without disturbance of the other selected dies.

13. The combination, with a series of guides, of a corresponding series of independently-movable fonts of disconnected dies mounted in said guides, independently-controllable stop devices for stopping said fonts in a proper relative position to assemble the selected dies into a transverse line, and an indicating device to show what dies have been assembled in the transverse line for the detection and correction of errors.

14. The combination, with a series of guides, of a corresponding series of independently-movable fonts of disconnected dies mounted in said guides, independently-controllable stop devices for stopping said fonts in a proper relative position to assemble the selected dies into a transverse line, and a selected die-indicator consisting of independent character-bars movable into an exposed transverse line coincidently with the assembling of the selected dies.

15. The combination, with a series of guides, of a corresponding series of independently-movable fonts of disconnected dies mounted in said guides, independently-controllable stop devices for stopping said fonts in a proper relative position to assemble the selected dies into a transverse line, and a selected die-indicator consisting of independent character-bars movable into an exposed transverse line coincidently with the assembling of the selected dies, and a proof-taking device, whereby a proof is taken of each line of indicator characters as assembled.

16. The combination, with a series of guides, of a corresponding series of fonts of disconnected dies movable longitudinally of said guides, stops movable into the paths of motion of said fonts at different points to stop the same in the proper relative positions to assemble the selected dies into a transverse line, a character-board containing characters corresponding to the dies, and intervening connecting mechanism from said character-board to said stops for actuating the same.

17. The combination, with a series of fonts of disconnected dies and mechanism for assembling dies selected from said fonts into a line, of an impression material and a duplicating impression device adapted to take two or more impressions in succession directly from the line of dies.

18. The combination, with a series of fonts of disconnected dies and mechanism for assembling dies selected from said fonts into a line, of an impression device, the said line of dies and impression material being movable relatively to each other, whereby successive impressions can be made, substantially as and for the purpose specified.

19. The combination, with a series of guides, of a corresponding series of fonts of disconnected dies movable in said guides, and devices for stopping the motion of said fonts at different points to bring the same in proper relative positions to assemble the selected dies into a transverse line, substantially as and for the purpose specified.

20. The combination, with a series of guides, one part of said series being stationary and the other movable, of a series of fonts of dies movable in said guides, substantially as and for the purpose specified.

21. The combination, with a series of partible guides and means for moving one part of said series to and from the other, of a series of dies mounted in the movable part of said series and a series of stops located in the stationary part thereof, substantially as and for the purpose specified.

22. The combination, with a series of partible guides and a series of fonts of dies movable in said guides, of an impression-bed and means for operating said bed, substantially as and for the purpose specified.

23. The combination, with a series of guides, one part of which is movable with relation to the other, and a series of fonts of disconnected dies movable in said guides to assemble the selected dies into a transverse line, of an impression-bed and means for receiving the selected dies and forcing them together into a justified line, substantially as and for the purpose specified.

24. The combination, with a series of partible guides and means for moving one part of said series to and from the other part, of a series of fonts of disconnected dies mounted in said guides and movable therein to assemble the selected dies into a transverse line, an impression-bed, means for compacting the assembled dies into a justified line, and an impression-roller, substantially as set forth.

25. The combination, with a series of guides, one part of which is fixed to the frame and the other movable with relation thereto, of a series of fonts of disconnected dies mounted in the movable part of the guides and a series of stops located in the stationary part of said guides, substantially as set forth.

26. In combination with a series of guides, a series of fonts of dies mounted therein, a series of push-heads, a series of stop-heads, and a series of stops movable in and out of the guide-channels, substantially as set forth.

27. The combination, with the guide-channels and series of fonts of disconnected dies therein, of movable stop-heads placed in each channel in advance of each font and movable stops for arresting the motion of the stop-heads and dies, substantially as set forth.

28. In combination with a guide-channel and series of dies therein, a stop-head located within the channel in advance of the dies and provided with a yielding portion, substantially as set forth.

29. The combination, with a series of guide-channels formed of grooved bars having widened bases, of a series of fonts of dies movable therein, a stop-head in advance of each font having ribs fitting within the grooves in the said bars, and a push-head at the rear of each font, having similar ribs, substantially as set forth.

30. The combination, with a guide, a series of disconnected dies, a stop-head, and a push-head movable in said guide, of a dog and mechanism for tripping said dog to release the stop-head and permit the font to move forward, substantially as set forth.

31. In combination with a series of guides, a series of fonts of disconnected dies, a series of push-heads, a series of stop-heads, a series of dogs, mechanism for tripping any one of said dogs to release the stop-head of the desired channel, a series of stops, and mechanism for operating said stops, substantially as set forth.

32. The combination, with a series of guide-channels, of a series of fonts of disconnected dies movable therein, an impression-bed, sliding carriers for receiving the selected dies from the type-channels, and means for forcing said carriers together to assemble the selected dies into a justified line, substantially as set forth.

33. The combination, with the guide-channels arranged side by side and fonts of disconnected dies mounted in said channels, of sliding carriers for receiving the dies selected from the fonts and assembling them into a justified line, an impression-bed, and guiding and clamping bars for holding the dies rigidly in alignment, substantially as set forth.

34. The combination, with movable fonts of disconnected dies, of an impression-bed, die-carriers for assembling the dies in a transverse line, and clamping devices attached to the bed and serving to hold the dies held in the carriers in alignment while the impression is being made, substantially as set forth.

35. The combination, with an impression-bed and die-carriers, of slotted posts attached to the bed and clamping-bars mounted in the slots of the posts, substantially as and for the purpose specified.

36. The combination, with an impression-bed and die-carriers, of posts attached to the bed and clamping-bars loosely connected to the posts, substantially as set forth.

37. The combination, with a transverse line of dies and means for supporting the same, of movable bail-shaped clamping-bars, substantially as set forth.

38. The combination, with the main frame and slotted pieces secured to the top thereof, of the impression-bed, slotted posts secured to said bed, the die-carriers, and the clamping-bars carried by the slotted posts and having ends projecting within the slots of the top pieces of the frame, substantially as set forth.

39. The combination, with the main frame having slotted top pieces provided with lateral projections, of the movable impression-bed, the die-carriers, and the clamping-bars having parts adapted to engage with the said lateral projections, substantially as set forth.

40. The combination, with the die-carriers, the movable impression-bed, and the clamping-bars carried thereby, of a spring for forcing down the clamping-bars and the dies when the downward movement of the bed occurs, substantially as set forth.

41. The combination, with the guide-channels and fonts of disconnected dies, said fonts being movable therein, of an impression-bed, die-carriers, clamping devices, and a check-bar, substantially as and for the purpose specified.

42. The combination, with the guide-channels and fonts of disconnected dies therein, of an impression-bed, die-carriers, clamping-bars, and a loop-shaped check-bar having a thin edge, substantially as set forth.

43. The combination, with the table $b$, having posts $l^5$, of the check-bar $l^2$, hinged in said posts and having a thin edge $l^{14}$, the movable impression-bed $c^{20}$, having slotted posts $l^3$, and the clamping-bars $l\ l'$, mounted in the slotted posts, substantially as set forth.

44. The combination of the box-like frame supported by suitable standards, the parallel bars having channels between them, and the fonts of disconnected dies or types mounted in said channels, each type having a body resting on the bars and a projection or leg which extends down into the channel, substantially as set forth.

45. The combination, with the frame and fixed guide-bars having slots in their ends, of the movable guide-bars having tongues which enter the said slots, substantially as set forth.

46. The fixed guide-bars having vertical and horizontal slots, in combination with the movable guide-bars having tongues with inclined ends and wedge-shaped plates, substantially as set forth.

47. The fixed guide-bars having slots in their ends, the impression-bed, and the die-carriers, in combination with the movable guide-bars having tongues and wedge-shaped plates, substantially as set forth.

48. The combination of the fixed guide-bars having slots, stops placed in said slots, the fonts of disconnected dies, and means for throwing the stops into the type-channels, substantially as set forth.

49. The combination, with the fixed guide-bars having a series of recesses and widened bases containing vertical slots, of crank-shaped stops and mechanism for operating said stops, substantially as set forth.

50. The fixed guide-bars $b'$, having widened bases containing vertical slots $b^6$ and above said bases recesses $b^{26}$, in combination with the crank-shaped stops $b^7$, having projecting portions $b^8\ b^{10}$, substantially as set forth.

51. The combination, with the guide-bars and series of stops, of the fonts of disconnected dies, a stop-setting carriage, and mechanism for operating the same, substantially as set forth.

52. The combination, with the guide-bars and series of stops movable in and out of the channels between said bars and the series of fonts of disconnected dies, of a carriage, a series of movable pieces on said carriage, and means for throwing up any one of said pieces, whereby the desired stop may be made to obstruct the channel, substantially as set forth.

53. The combination, with the guide-bars and series of stops movable in and out of the channels between said bars, of a carriage, a series of springs on said carriage, and mechanism for throwing up any one of said springs, substantially as set forth.

54. The combination, with the guide-bars and series of stops, of a carriage, a series of springs thereon, means for intermittingly advancing said carriage, and means controlled by key-levers for throwing up the desired springs on the carriage, substantially as set forth.

55. A stop-setting carriage provided with a series of springs, in combination with a series of sliding and vertically-movable bars and devices for operating said bars, substantially as set forth.

56. The combination of the stop-setting carriage, slides to which said carriage is connected, movable in guides in the frame, gearing for operating said slides, a weight or its equivalent for advancing said carriage, and pawl-and-ratchet devices for releasing the carriage to permit the advance thereof, substantially as set forth.

57. The combination, with the carriage $e$, provided with a series of springs $e^4$, slides $e'$ $e^2$, to which said carriage is connected, shaft $e^5$, having pinions $e^3\ e^4$, sliding and vertically-movable bars $e^{23}$, and key-levers $e^{32}$, of pawl-and-ratchet devices for releasing shaft $e^5$ and means actuated by the bars $e^{23}$ for releasing said pawl-and-ratchet devices, substantially as set forth.

58. The combination of the key-levers, the series of longitudinally and vertically movable bars actuated by said levers, the carriage, the series of springs thereon, the stops, and the guide-channels, substantially as set forth.

59. The combination of the guide-bars, the series of stops, the stop-setting carriage, a cord and weight for advancing said carriage, a series of springs attached to the carriage, a series of bars having inclined slots, means for actuating said bars, bail-shaped bars hinged to the main frame, and means for connecting the bail-shaped bars with the devices for releasing the carriage, substantially as set forth.

60. The combination of the guide-bars, the fonts of disconnected dies, the series of stops, mechanism for setting said stops, and mechanism for returning said stops to their original positions, substantially as set forth.

61. The combination, with a series of guide-bars, of a series of stops mounted in the channels between said bars and provided with depending portions, and a device engaging with such portions for withdrawing the stops from the channels, substantially as set forth.

62. The combination, with a series of guide-bars, of a series of stops movable into and out of the channels between said bars and provided with portions depending below said bars, and a movable plate having slots for receiving said depending portions of the stops, substantially as set forth.

63. The combination, with the guide-bars, stops, and movable plate, of a stop-setting carriage and means carried by such carriage for operating the movable plate, substantially as set forth.

64. The combination, with the guide-bars, stops, and movable plate, of the carriage, pins on the slide-bars of the carriage, and means actuated by said pins for operating the movable plate, substantially as set forth.

65. The combination, with the guide-bars and stops, of a plate provided with a series of slots through which the lower ends of the stops project, swinging supports for said plate, a stop-setting carriage, and pins thereon for operating the supports, substantially as set forth.

66. The combination, with the guide-bars and crank-shaped stops, of the plate $b^{13}$, having slots $b^{12}$, the cross-pieces $b^{14}$, movable in horizontal slots $a^{17}$, the swinging supports $b^{14}$ $b^{17}$, and the stop-setting carriage having pins $e^{15}$, substantially as set forth.

67. The combination, with the guide-bars and dogs at the end of one section thereof, of the fonts of disconnected dies, the stop-setting carriage and means carried thereby for releasing the dogs, the stop-heads, and the fonts of disconnected dies, substantially as set forth.

68. The combination, with the guide-bars, the stops, the pivoted dogs, and the fonts of disconnected dies, of the push-heads and the stop-setting carriage having an inclined surface on one of its slides, substantially as set forth.

69. The combination, with the guide-bars, the stops, and the fonts of disconnected dies, of a collecting-bar for forcing the dies back to their normal positions in the guide-channels, substantially as set forth.

70. The combination, with the guide-channels and fonts of disconnected dies movable in said channels, of a series of die-carriers movable toward and from each other, substantially as and for the purpose specified.

71. The combination, with the guide-channels and fonts of disconnected dies movable in said channels, of a series of die-carriers movable toward and from each other, each carrier being slotted to receive the die, substantially as set forth.

72. The combination, with a support, of a series of die-carriers, each carrier being provided with a projecting rod or wire, substantially as set forth.

73. A die-carrier consisting of a perforated body having a slot for the reception of the die and a projecting rod or wire, substantially as set forth.

74. The combination, with a series of guides and fonts of disconnected dies mounted in said guides, of an impression-bed and die-carriers and distributers mounted on said bed, substantially as set forth.

75. The combination, with the guide-bars and fonts of disconnected dies mounted in the channels between said bars, of an impression-bed, slotted die-carriers on said bed, plates inclosing the outer and upper sides of said carriers, and mechanism for forcing the carriers together to assemble the dies held by them into a justified line, substantially as set forth.

76. The combination, with a series of die-carriers, each provided with a projecting rod or wire terminating in a head, of an impression-bed and mechanism for forcing the carriers together thereon, substantially as set forth.

77. The combination, with the impression-bed, of the series of die-carriers movable thereon, a condensing-carriage, and a plate connected thereto for forcing the carriers together, substantially as set forth.

78. The combination, with the die-carriers and support therefor, of a condensing-carriage, gathering-plates thereon, and mechanism for operating said carriage, substantially as set forth.

79. The combination, with the die-carriers, of a condensing-carriage, a fixed gathering-plate at one end of said carriage, and a yielding gathering-plate connected to the other end thereof, substantially as set forth.

80. The combination, with the movable die-carriers, of a condensing-carriage, a gathering-plate fixedly attached thereto, a rod, and a gathering-plate yieldingly supported on said rod, substantially as set forth.

81. The combination, with the die-carriers, of the condensing-carriage, the gathering-plate fixed to one end thereof, the rod attached to the other end of said carriage, a spring coiled around said rod, and a gathering-plate sleeved on the rod and bearing against the spring, substantially as set forth.

82. The combination, with the die-carriers, of the condensing-carriage, the gathering-plates, the lever connected to said carriage, and mechanism for operating the lever, substantially as set forth.

83. The combination, with the die-carriers and condensing-carriage provided with gathering-plates, of a pivoted lever connected to said carriage, links connecting said lever with a second lever, and a cam-wheel, substantially as set forth.

84. The combination, with the die-carriers and movable condensing-carriage, of a pivoted arm, a latch for said arm, and a projection on the condensing-carriage which comes into contact with said arm, substantially as set forth.

85. The combination, with the die-carriers and condensing-carriage, of a pivoted arm, a projection on the carriage for stopping the movement thereof by engagement with such arm, and a lever made of elastic material for actuating the condensing-carriage, substantially as set forth.

86. The combination of the die-carriers, the condensing-carriage, the gathering-plates carried by said carriage, a right-angled pivoted arm, a spring-actuated latch for engaging the lower part of said arm, and means on the carriage for tripping the latch, substantially as set forth.

87. The combination, with an impression-bed, of a series of die-carriers, guiding-plates for said carriers, a condensing-carriage, a fixed gathering-plate at one end of said carriage, a headed rod attached to the other end of the carriage, a spring coiled around the rod, a sleeve loosely mounted on the rod between the spring and head thereof, a gathering-plate attached to said sleeve, and a lever for operating the condensing-carriage, substantially as set forth.

88. The combination, with a series of guide-bars and series of fonts of disconnected dies movable longitudinally in the channels between said bars, of an impression-bed, a series of die-carriers thereon, a condensing-carriage, and means carried thereby for forcing the carriers and dies into a compact transverse line, and clamping-bars dropped astride the line of dies, substantially as set forth.

89. The combination, with the impression-bed, of the die-carriers $c\,c$, each provided with a headed rod $c^{22}$, substantially as set forth.

90. A die-carrier having a perforated body provided with a laterally-projecting headed rod and with a vertically-projecting slotted portion narrower than the body for the reception of the die, substantially as set forth.

91. The combination, with the guide-bars, of a series of fonts of disconnected dies movable therein, each die consisting of a body which rests on the bars, a projection or leg extending into the channel between the bars, and a cut-away portion, substantially as set forth.

92. The combination, with the standards, of an impression-roll journaled therein, an impression-sleeve, a gear on said sleeve, a device for holding the matrix material, and a rack for engaging the gear on the impression-sleeve, substantially as set forth.

93. The combination, with an impression-roll, of a holder for the matrix material, a rod attached to said holder, and means for actuating said rod to move the holder along the roll, substantially as and for the purpose specified.

94. The combination, with the standards and cross-rod, of an impression-roll, a sleeve movable endwise on said roll, a holder for the matrix material, and arms connecting said holder to a sleeve on the cross-rod, substantially as set forth.

95. The combination, with the impression-roll, of a sleeve splined to said roll, a holder for the impression material, gearing on the holder and sleeve, and means for rotating the impression-roll, substantially as set forth.

96. The combination, with the standards, the impression-roll journaled therein, and a ratchet-wheel on the end of said roll, of the impression-sleeve, a bent lever hung on the axis of the impression-roll, a pawl attached to said lever, and mechanism for operating said lever, substantially as set forth.

97. The combination, with the impression-roll having a ratchet-wheel on its end, of a bent lever hung to the axis of said roll and carrying a pawl, a slotted plate adjustable on the lower end of the bent lever, and means for actuating the lever to turn the impression-roll, substantially as set forth.

98. The combination, with the impression-roll having a ratchet-wheel on one end, of a bent lever sleeved on said roll and carrying a pawl, a plate hinged to the lower part of said lever and provided with a slot, a thumb-screw working through the slot, and a toggle connected with another slot in the lever, substantially as set forth.

99. The combination, with the impression-roll, the impression-sleeve, and the holder for the matrix material, of a connecting-rod, a segment-gear to which said rod is connected, a second segment-gear, and means for actuating said gear, substantially as set forth.

100. The combination, with an impression-roll, an impression-sleeve, and a holder for the matrix material, of a connecting-rod, two segment-gears, a sliding sleeve, a swinging pawl, and pins on the upper segment-gear with which the pawl alternately engages, substantially as set forth.

101. In a machine for the production of printing-surfaces, the combination, with a graduated scale, of a pointer, a swinging bar having a projection with an inclined surface, mechanism for actuating said bar, and devices intermediate to the bar and pointer, substantially as set forth.

102. The combination, with a graduated scale, of a pointer having a toothed rack, a lever-arm carrying a pawl engaging with the rack, a swinging bar having a projection with an inclined surface, and means for actuating said bar, substantially as set forth.

103. The combination, with the scale, pointer, rack, and lever-arm carrying a pawl, of a series of hinged bars having projections on their inner side and a projection on the other side of one of said bars provided with an inclined surface for actuating the lever-arm, substantially as set forth.

104. The combination, with the guide-bars, the series of stops, and the series of fonts of dies, of a series of weights for advancing the fonts, a series of parallel bars also connected to the weights and provided with letters on their front surfaces, and a frame having a horizontal slot, substantially as set forth.

105. The combination of a frame having a horizontal slot, a series of weights, and a series of bars connected to and movable with the weights, each of said bars having printed on its front surface the letters or characters produced by the machine, substantially as set forth.

106. The combination of the proof-printing table, a double pinion, one part of which engages with a stationary rack, and a sliding rack engaging with the other part of such pinion, substantially as set forth.

107. The combination, with the proof-printing table and a double pinion journaled to the under side of said table, of a stationary rack with which one part of said pinion engages, a sliding rack engaging the other part of said pinion, and means for operating said sliding rack, substantially as set forth.

FRANK AMOS JOHNSON.
WALTER E. CRANE.

In presence of—
JAS. F. WILLIAMSON,
EMMA F. ELMORE.